Dec. 22, 1931.   J. DELON   1,837,952
ELECTRIC CABLE
Filed Nov. 3, 1928
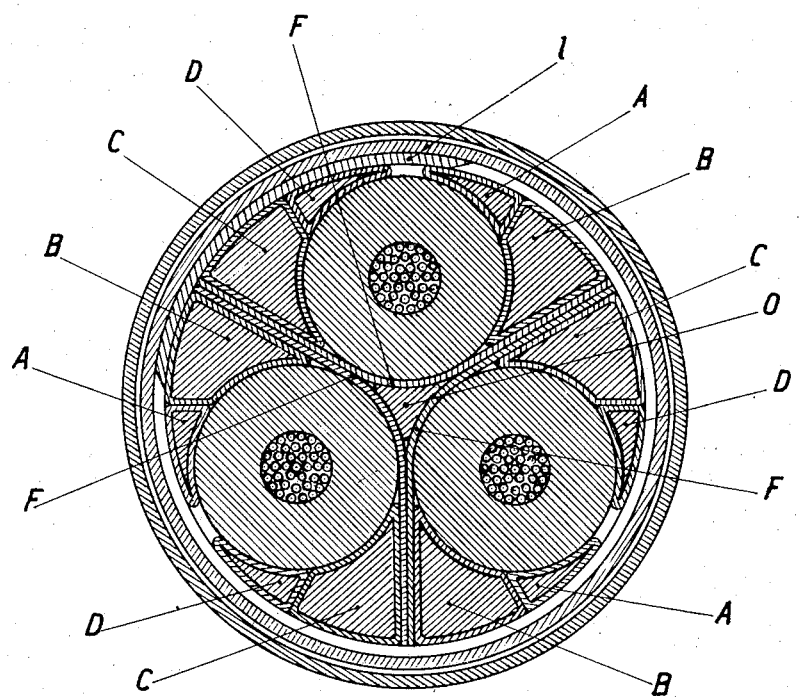

Patented Dec. 22, 1931

1,837,952

UNITED STATES PATENT OFFICE

JULES DELON, OF PARIS, FRANCE

ELECTRIC CABLE

Application filed November 3, 1928, Serial No. 316,945, and in Germany October 31, 1927.

In cables for the transmission of electric energy in the form of three-phase alternating current at present in use the surfaces of the packings are rendered conducting by wrapping them in a thin strip or ribbon of metal in such manner as to provide a cable having equipotential surfaces, the cooling of which is greatly improved as compared with that obtained in an ordinary cable in consequence of the thermal conductivity of the conducting surfaces wrapped around the packing.

The present invention has for its object improvements permitting cooling of the cables to a very much greater extent than is obtained with existing constructions.

In cables in accordance with the invention the heat conducting paths which permit of transferring to the periphery of the cable the heat which is developed in the central part, are formed solely by the conducting surfaces which enclose the whole of each packing. The method forming the object of the present invention consists in sub-dividing each of the three packings into a certain number of elements which are themselves enwrapped individually by a thin strip of metal.

The invention is illustrated in the accompanying drawing which shows a cable constructed in accordance with this method.

Referring to the drawing, A, B, C, D indicate the elements of sub-divided packings. The thin metal sheets or leaves F connect the surface of the central packing O with the conducting surfaces of the packings B and C. These sheets or leaves are placed in position in assembling the conductors.

It will be seen from the drawing that the heat conducting paths obtained are constituted by a double thickness of metal strip on the adjacent elements A and B and C and D and by a quadruple thickness of metal strip in the adjacent parts of the elements B and C. The heat developed in the interior of the cable while it is in operation is thus more easily withdrawn that it is in cables not provided with such an arrangement.

The number of sub-divided elements of each packing may be varied with the dimensions of the cable. For large cables in order to maintain good contact of the metal sheets with one another and with the surfaces of the insulator which encloses each of the conductors it is advisable to bind the unit formed by the conductors and the metallized packings by means of a sheet of brass in spaced spires applied hot and indicated by 1 in the drawing. Contact of the lead sheathing with the metallic surface of the packings is thus effected through the medium of this sheet of brass which is firmly locked on the external surfaces of the metal strips embracing the packings.

Having thus fully described the invention, what I claim as new and desire to protect by Letters Patent is:

1. An electric cable having a lead sheath combining several separately insulated conductors without conducting covering, a central packing filling the space formed between the conductors, packings subdivided into several elements filling the spaces formed between the conductors and the lead sheathing, each of these elements of the packing being enveloped by one separate thin conducting covering wound spirally around the element, these conducting coverings being conductively bound and connected inter se and with the lead sheathing by a metallic strip wound spirally around the conductors and packing elements.

2. An electric cable having a lead sheath combining several separately insulated conductors without conducting covering, a central packing filling the space formed between the conductors, packings subdivided into several elements filling the spaces formed between the conductors and the lead sheathing, each of these elements of the packing being enveloped by one separate thin conducting covering wound spirally around the element, these conducting coverings being conductively bound and connected inter se and with the lead sheathing by a metallic strip formed of brass, applied tightly and wound spirally around the conductors and packing elements.

In witness whereof I have hereunto set my hand.

JULES DELON.